(12) United States Patent
Morreale

(10) Patent No.: US 12,497,994 B2
(45) Date of Patent: Dec. 16, 2025

(54) PUMP CROSSHEAD AND CONNECTING ROD ASSEMBLIES

(71) Applicant: A&W Energy, LLC, Fort Worth, TX (US)

(72) Inventor: John D. Morreale, Houston, TX (US)

(73) Assignee: A&W Energy, LLC, Fort Worth, TX (US)

( * ) Notice: Subject to any disclaimer, the term of this patent is extended or adjusted under 35 U.S.C. 154(b) by 0 days.

(21) Appl. No.: 18/423,885

(22) Filed: Jan. 26, 2024

(65) Prior Publication Data

US 2024/0254985 A1   Aug. 1, 2024

Related U.S. Application Data

(60) Provisional application No. 63/441,924, filed on Jan. 30, 2023.

(51) Int. Cl.
| | | |
|---|---|---|
| *F16C 5/00* | (2006.01) | |
| *F16C 7/02* | (2006.01) | |
| *E21B 43/26* | (2006.01) | |
| *F04B 53/00* | (2006.01) | |

(52) U.S. Cl.
CPC ............... *F16C 5/00* (2013.01); *F16C 7/023* (2013.01); *E21B 43/2607* (2020.05); *F04B 53/006* (2013.01)

(58) Field of Classification Search
CPC .... E21B 43/2607; E21B 53/006; E21B 53/18; F16C 5/00; F16C 7/023
See application file for complete search history.

(56) References Cited

U.S. PATENT DOCUMENTS

| | | | | |
|---|---|---|---|---|
| 2008/0006148 | A1* | 1/2008 | McKelroy | F04B 53/144 92/190 |
| 2012/0234539 | A1* | 9/2012 | Brunet | F01M 1/06 166/305.1 |
| 2017/0284453 | A1* | 10/2017 | Delmotte | F16C 17/02 |
| 2020/0332788 | A1* | 10/2020 | Cui | F04B 1/00 |
| 2022/0389916 | A1* | 12/2022 | Keith | F04B 9/045 |

\* cited by examiner

*Primary Examiner* — Minnah L Seoh
*Assistant Examiner* — Gregory T Prather
(74) *Attorney, Agent, or Firm* — Harper & Bates LLP; Shannon W. Bates

(57) ABSTRACT

A pump power end includes an assembly comprising a crosshead, a connecting rod, and a joint. The joint may include a knuckle and a keeper. The connecting rod may include a forked end comprising two tines with a gap in the middle. The knuckle of the joint may be fixedly coupled to both tines. The crosshead may include a socket within which the knuckle of the joint is rotatably received. The keeper of the joint may include a body with a recess aligned with the socket to form a cavity within which the knuckle is disposed. The body of the keeper may be coupled to the crosshead and reside in the gap in the forked end of the connecting rod to retain the knuckle.

18 Claims, 4 Drawing Sheets

PUMP CROSSHEAD AND CONNECTING ROD ASSEMBLIES

CROSS-REFERENCE TO RELATED APPLICATIONS

This application claims the benefit of and priority to U.S. Provisional Patent Application Ser. No. 63/441,924 filed Jan. 30, 2023 and entitled "Pump Crosshead and Connecting Rod Assemblies", which is incorporated herein by reference for all purposes.

TECHNICAL FIELD

The present disclosure relates generally to well service pumps, and more particularly to pump crosshead and connecting rod assemblies for hydraulic fracturing pumps, and associated methods of use.

BACKGROUND

Hydraulic fracturing pumps, also referred to as "frac pumps", are commonly used in oilfield operations to supply pressurized fluid downhole. Hydraulic fracturing pumps are typically constructed as multi-cylinder reciprocating pumps with a power end and a fluid end. The power end comprises the driving assembly that operates piston plungers to reciprocate into and out of the cylinders of the fluid end of the pump.

Crosshead and connecting rod assemblies are part of the driving assembly used to convert rotary motion generated at the power end of the reciprocating pump into linear motion to drive the piston plungers in the fluid end of the pump. The crankshaft of the pump is coupled to a slider mechanism, commonly called a crosshead, by a connecting rod to convert the rotary motion of the crankshaft into linear motion. A joint is provided between the crosshead and the connecting rod that allows force to be transferred between these components in an oscillating fashion during the discharge stroke and the suction stroke of the pump.

SUMMARY

A pump power end includes an assembly comprising a crosshead, a connecting rod, and a joint that comprises a knuckle and a keeper.

In one implementation, the connecting rod includes a forked end comprising two tines with a gap in the middle, and the knuckle of the joint is fixedly coupled to both tines. In one implementation, the crosshead comprises a socket within which the knuckle is rotatably received. In one implementation, the keeper of the joint includes a body with a recess aligned with the socket to form a cavity within which the knuckle is disposed. The body of the keeper resides in the gap in the forked end of the connecting rod to retain the knuckle.

In operation, on the load stroke of the power end, force is transmitted through the tines of the forked end of the connecting rod, through the knuckle and into the crosshead. On the return stroke of the power end, the crosshead is pulled back via the keeper that resides in the gap of the forked end of the connecting rod.

The details of one or more implementations of the assemblies and methods of the present disclosure are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

A hydraulic fracturing pump may be a multi-cylinder reciprocating pump with a power end and a fluid end. The power end drives piston plungers reciprocating into and out of cylinders in the fluid end. As a result, fluid is drawn into the cylinders of the fluid end through a suction manifold and then discharged under pressure through a discharge outlet of the fluid end.

The power end of a well service pump operates by rotating a crankshaft that drives connecting rods in a reciprocating fashion. Each of the connecting rods is coupled to a crosshead that linearly drives a pony rod. The pony rods are connected to piston plungers that reciprocate into and out of cylinders in the fluid end.

The present disclosure is directed to crosshead and connecting rod assemblies used to convert rotary motion generated at the power end of a hydraulic fracturing pump into linear motion to drive piston plungers in the fluid end of the pump.

Figure 1:
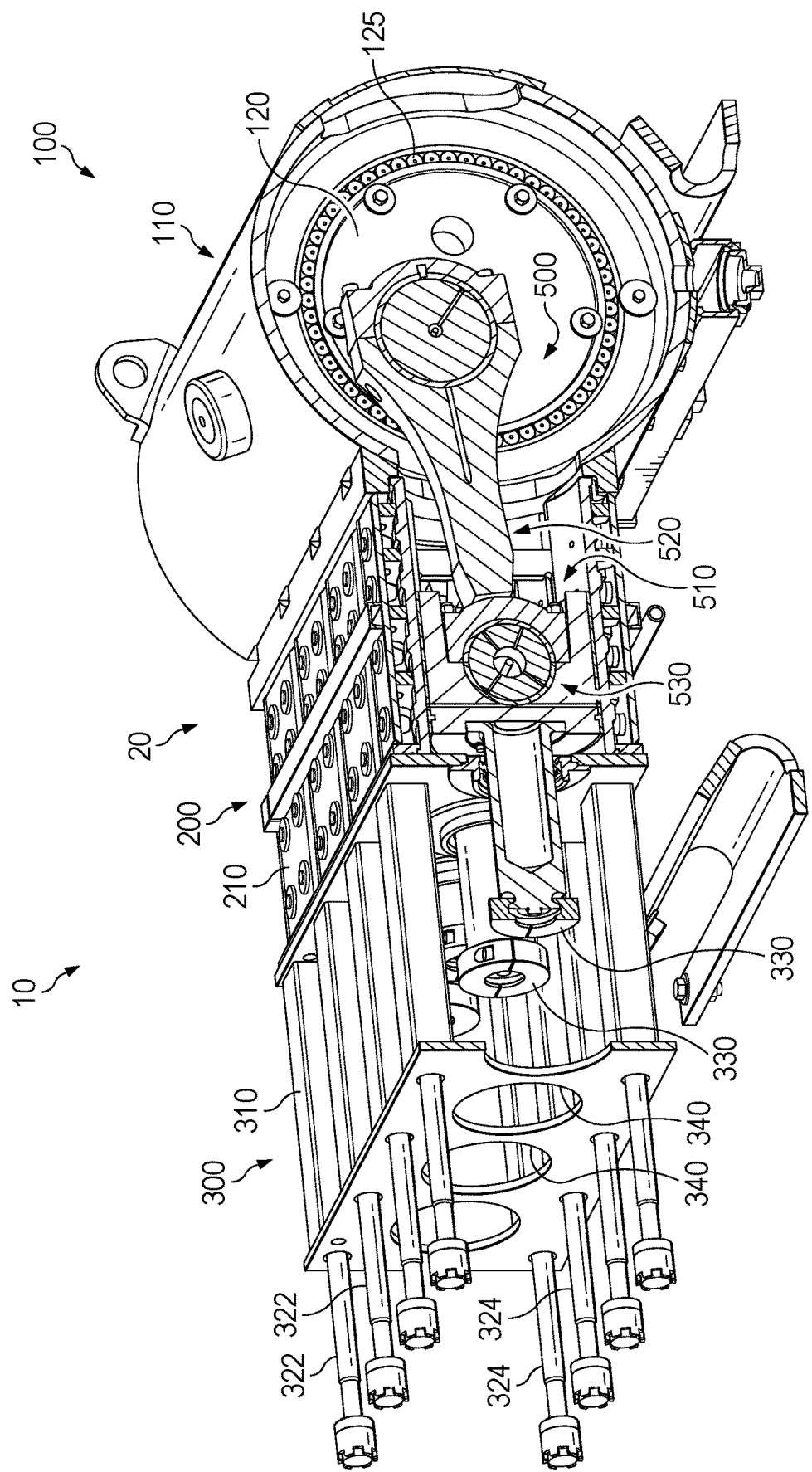
FIG. 1 depicts a perspective, partial cut-away view of a representative power end of a hydraulic fracturing pump comprising one implementation of a crosshead and connecting rod assembly according to the present disclosure.

Referring now to the drawings, where like reference numerals represent like components, FIG. 1 depicts a side perspective view, partially in cross section, of a representative power end 10 of a five-cylinder hydraulic fracturing pump, also referred to as a quintuplex pump. A three-cylinder hydraulic fracturing pump, also referred to as a triplex pump, is also commonly used in the oilfield.

Power end 10 comprises a crankshaft portion 100, a crosshead portion 200 and a spacer portion 300. A frame 20 of the power end 10 comprises a crankshaft housing 110, a crosshead housing 210 and a spacer housing 310 coupled together by a plurality of upper stayrods 322 and a plurality of lower stayrods 324.

An implementation of a crosshead and connecting rod assembly 500 of the present disclosure is shown installed within the power end frame 20 and coupled to a crankshaft 120, which is positioned within the crankshaft housing 110 and supported by crankshaft bearings 125. The assembly 500 of the present disclosure comprises a crosshead 510, a connecting rod 520, and a joint 530 that couples the crosshead 510 and connecting rod 520 together.

As shown in FIG. 1, a plurality of pony rods 330 each couple to a corresponding one of the plurality of crossheads 510 to extend between the crosshead housing 210 and the spacer housing 310. The spacer housing 310 further comprises a plurality of openings 340 through which a plurality of fluid end piston plungers (not shown) extend. Each of the fluid end piston plungers couples to a corresponding one of the plurality of pony rods 330.

In operation, a motor-driven gear reducer assembly on the power end 10 drives a crankshaft 120, and the crankshaft 120 reciprocates the plungers within the fluid end. The assembly 500 of the present disclosure couples the crankshaft 120 to the plungers via the pony rods 330.

Figure 2:
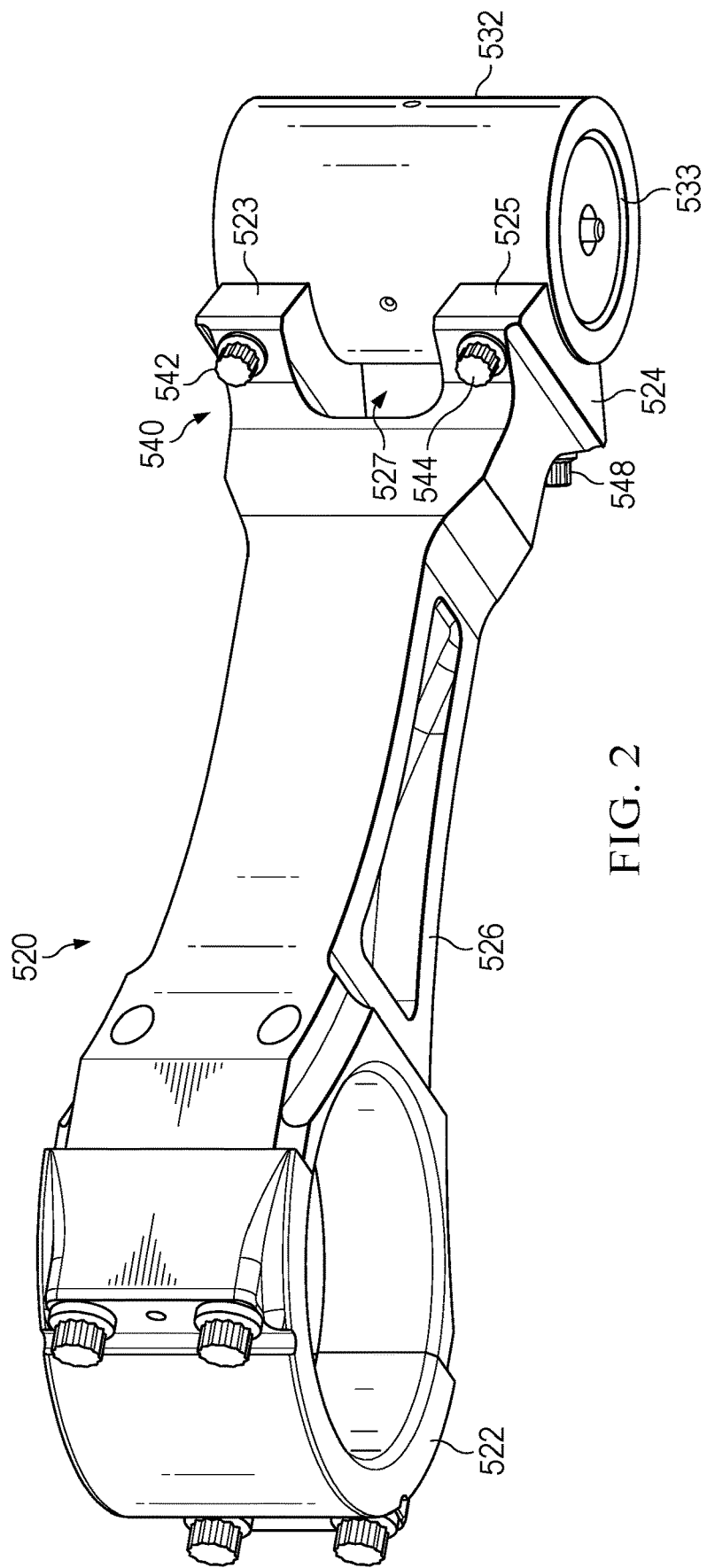
FIG. 2 depicts a top and side perspective view of one implementation of a connecting rod coupled to a partial joint comprising a knuckle according to the present disclosure.

Referring now to FIG. 2, one implementation of a connecting rod 520 of the present disclosure is depicted, coupled to a knuckle 532 that forms part of the joint 530 between the connecting rod 520 and the crosshead 510 of the assembly 500. The connecting rod 520 includes a first end 522 for rotatably coupling the connecting rod 520 to a crankshaft 120, a second end 524 for fixedly coupling the connecting rod 520 to the knuckle 532, and a shaft portion 526 extending between the first end 522 and the second end 524 of the connecting rod 520. In some implementations, the second end 524 of the connecting rod 520 is forked to include a first tine 523, a second tine 525, and a gap 527 therebetween. In some implementations, a plurality of fasteners 540, such as screws 542, 544, 546, 548, fixedly connect the first tine 523 and the second tine 525 of the forked second end 524 of the connecting rod 520 to the knuckle 532. In some implementations, the connecting rod 520 and the knuckle 532 are formed of the same material, which may be forged steel. In some implementations, the knuckle 532 may be formed into a generally cylindrical shape and may include one or more counterbores 533 to trap oil for lubrication purposes.

Figure 3:
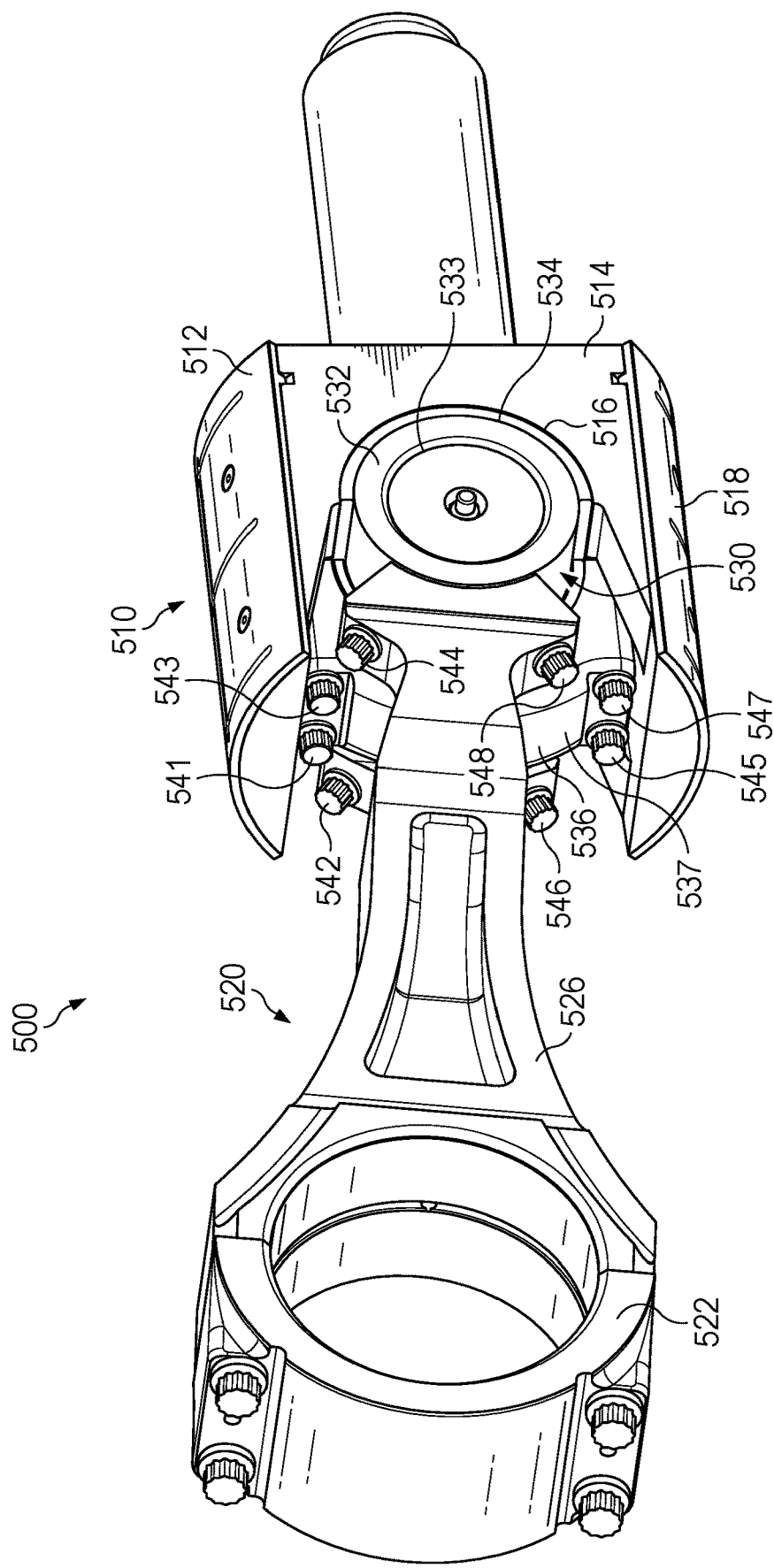
FIG. 3 depicts a side perspective view of one implementation of a crosshead and connecting rod assembly coupled together via a joint comprising a knuckle and a keeper according to the present disclosure.

FIG. 3 depicts one implementation of the full assembly 500 of the present disclosure comprising the crosshead 510, the connecting rod 520, and the joint 530. The crosshead 510 includes a top surface 512, a middle portion 514 with a semicircular socket 516 formed therein, and a bottom surface 518. The socket 516 receives the knuckle 532 of joint 530 and allows pivotal rotation between the crosshead 510 and the connecting rod 520. In some implementations, a length of the socket 516 is approximately equal to a length of the knuckle 532. The socket 516 is further sized to accommodate placement of a first wear surface 534 between the knuckle 532 and the socket 516. In some implementations, the first wear surface 534 comprises half of a split brass or bronze bearing.

Figure 4:
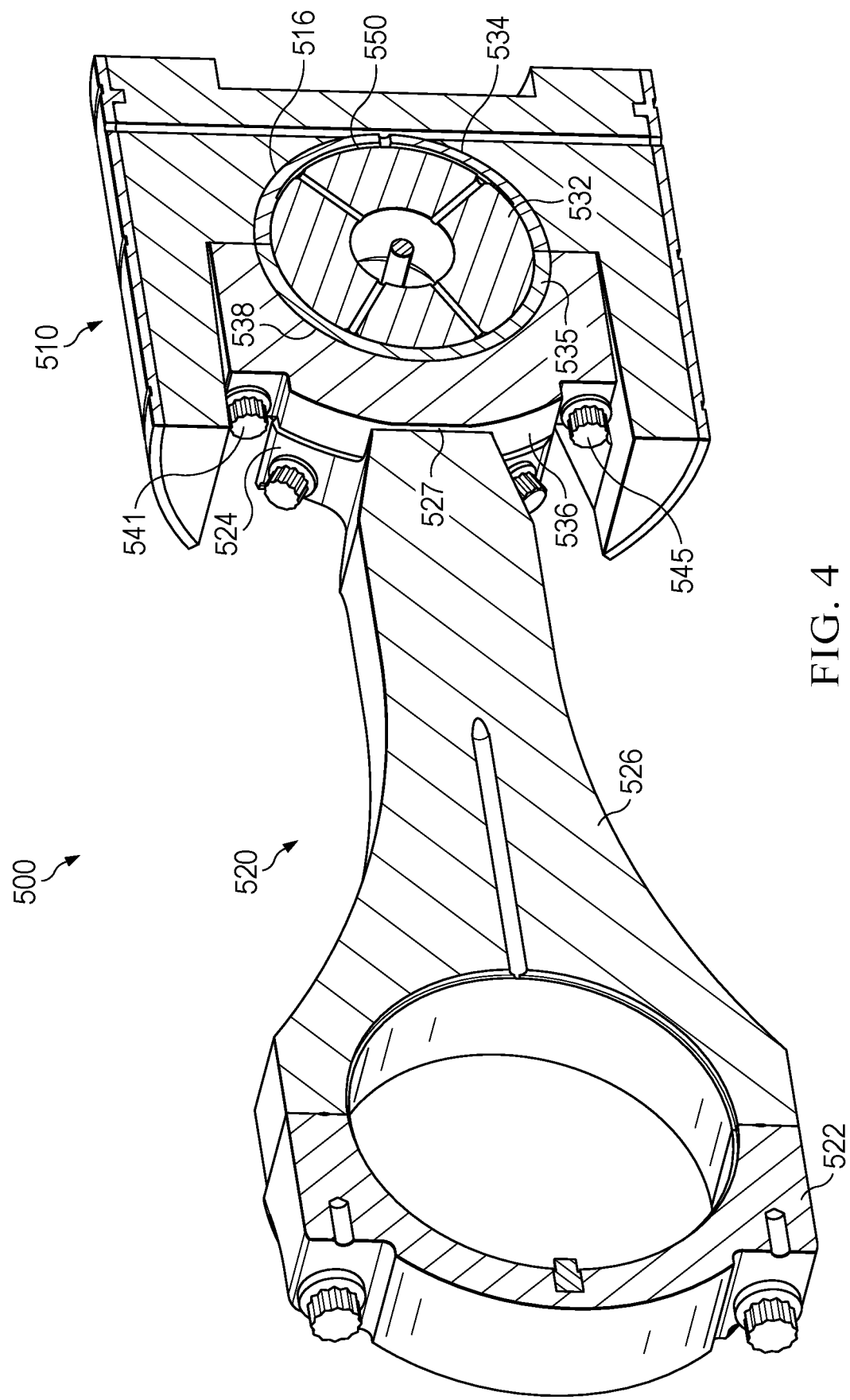
FIG. 4 depicts a cross-sectional side view of the crosshead and connecting rod assembly of FIG. 3.

Referring now to both FIG. 3 and FIG. 4, the joint 530 of the present disclosure further comprises a keeper 536. In one implementation, the keeper 536 has a substantially C-shaped body 537 that forms a semi-circular recess 538. The C-shaped body 537 is positioned within the gap 527 of the forked second end 524 of the connecting rod 520 such that the recess 538 is facing the crosshead 510. The semi-circular recess 538 aligns with the socket 516 in the crosshead 510 to form a substantially circular cavity 550 within which the knuckle 532, the first wear surface 534, and a second wear surface 535 are retained. As depicted, the second wear surface 535 is disposed between the knuckle 532 and the recess 538. In some implementations, the second wear surface 535 is half of a split brass or bronze bearing. A plurality of fasteners 540, such as screws 541, 543, 545, 547, fixedly connect the C-shaped body 537 of the keeper 536 to the crosshead 510. In some implementations, the diameter of the substantially circular cavity 550 is substantially equal to the diameter of the knuckle 532. In some implementations, the diameter of the substantially circular cavity 550 is substantially equal to the diameter of the knuckle 532 with the wear surfaces 534, 535.

In operation, on the load stroke of the power end 10, force is transmitted through the tines 523, 525 of the forked second end 524 of the connecting rod 520, through the knuckle 532 and into the crosshead 510. On the return stroke of the power end 10, the crosshead 510 is pulled back via the keeper 536 that resides in the gap 527 of the forked second end 524 of the connecting rod 520.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An assembly comprising:
 a crosshead comprising a middle portion with a socket formed therein;
 a connecting rod comprising a forked end including a gap; and
 a joint that couples the crosshead to the connecting rod, the joint comprising:
  a knuckle fixedly coupled to the forked end of the connecting rod; and
  a keeper comprising:
   a body disposed within and filling the gap in the forked end of the connecting rod, wherein the body is fixedly coupled to the middle portion of the crosshead; and
   a recess aligned with the socket to form a cavity within which the knuckle is rotatably retained.

2. The assembly of claim 1, wherein the knuckle comprises one or more counterbores to trap oil for lubrication.

3. The assembly of claim 1, wherein at least one of the connecting rod and the knuckle are formed of forged steel.

4. The assembly of claim 1, wherein the connecting rod and the knuckle are formed of the same material.

5. The assembly of claim 1, further comprising:
 a first wear surface disposed between the socket and the knuckle; and
 a second wear surface disposed between the recess and knuckle.

6. The assembly of claim 5, wherein:
the first and second wear surfaces comprise a split brass or bronze bearing.

7. A pump power end comprising:
the assembly of claim 1; and
a crankshaft.

8. The pump power end of claim 7, wherein the connecting rod further comprises:
a first end opposite the forked end, the first end configured to rotatably couple the connecting rod to the crankshaft; and
a shaft portion extending between the first end and the forked end.

9. A method of operating the pump power end of claim 8, comprising:
rotating the crankshaft to drive the connecting rod in a reciprocating fashion between a load stroke and a return stroke;
on the load stroke, transmitting force from the crankshaft through the forked end of the connecting rod, through the knuckle and into the crosshead; and
on the return stroke, exerting a pulling force by the crankshaft onto the connecting rod via the keeper residing in the gap in the forked end of the connecting rod.

10. The assembly of claim 1, wherein:
the crosshead further comprises a top surface and a bottom surface; and
the joint is disposed entirely within the crosshead, between the top surface and the bottom surface.

11. The assembly of claim 1, wherein:
the socket and the recess are each semicircular in shape.

12. The assembly of claim 1, wherein:
the keeper body is C-shaped.

13. An assembly comprising:
a crosshead comprising a top surface, a middle portion with a semicircular socket formed therein, and a bottom surface;
a connecting rod comprising a forked end including a first tine, a second tine, and a gap therebetween; and
a joint separate from and disposed within the crosshead between the top surface and the bottom surface, the joint comprising:
a cylindrical knuckle fastened to the first tine and the second tine of the connecting rod; and
a C-shaped keeper including a semicircular recess;
wherein the keeper is fastened to the middle portion of the crosshead and oriented such that the semicircular recess is aligned with the semicircular socket to form a circular cavity within which the knuckle is rotatably retained; and
wherein the keeper is positioned within the gap, and the keeper engages the first tine and the second tine within the gap.

14. The assembly of claim 13, further comprising:
a first wear surface disposed between the socket and the knuckle; and
a second wear surface disposed between the recess and knuckle.

15. The assembly of claim 14, wherein:
the first and second wear surfaces comprise a split brass or bronze bearing.

16. A pump power end comprising:
the assembly of claim 13; and
a crankshaft.

17. The pump power end of claim 16, wherein the connecting rod further comprises:
a first end opposite the forked end, the first end configured to rotatably couple the connecting rod to the crankshaft; and
a shaft portion extending between the first end and the forked end.

18. A method of operating the pump power end of claim 17, comprising:
rotating the crankshaft to drive the connecting rod in a reciprocating fashion between a load stroke and a return stroke;
on the load stroke, transmitting force from the crankshaft through the forked end of the connecting rod, through the knuckle and into the crosshead; and
on the return stroke, exerting a pulling force by the crankshaft onto the connecting rod via the keeper positioned within the gap in the forked end of the connecting rod.

* * * * *